United States Patent [19]

Rollen

[11] Patent Number: 5,379,681
[45] Date of Patent: Jan. 10, 1995

[54] PASSIVE FILTER INCLUDING A SELF-REGENERATING COMPOSITION OF MATERIALS FOR SORBATION OF GASEOUS SUBSTANCES

[76] Inventor: Jarl-Erik Rollen, Magnehergskroken 5, S-122 31 Enskede, Sweden

[21] Appl. No.: 119,080
[22] PCT Filed: Mar. 20, 1992
[86] PCT No.: PCT/SE92/00176
  § 371 Date: Sep. 16, 1993
  § 102(e) Date: Sep. 16, 1993
[87] PCT Pub. No.: WO92/16291
  PCT Pub. Date: Oct. 1, 1992

[30] Foreign Application Priority Data

Mar. 21, 1991 [SE] Sweden .................. 9100852

[51] Int. Cl.⁶ .................................... B01D 53/04
[52] U.S. Cl. .......................... 96/132; 96/135; 96/154
[58] Field of Search ............... 95/117, 118, 141; 96/121, 132, 135, 153, 154

[56] References Cited

U.S. PATENT DOCUMENTS

| | | | |
|---|---|---|---|
| 1,972,368 | 9/1934 | Alex | 96/121 |
| 3,049,399 | 8/1962 | Gamson et al. | 95/117 X |
| 3,899,310 | 8/1975 | Chi et al. | 95/141 |
| 4,203,735 | 5/1980 | Colombo et al. | 95/141 X |
| 4,345,973 | 8/1982 | Ladisch et al. | 95/117 X |
| 4,391,859 | 7/1983 | Fogelberg | 427/421 |
| 4,442,242 | 4/1984 | Fogelberg | 523/200 |
| 4,604,110 | 8/1986 | Frazier | 95/141 X |
| 4,795,482 | 1/1989 | Gioffre et al. | 95/141 |
| 4,826,497 | 5/1989 | Marcus et al. | 604/359 |
| 4,855,154 | 8/1989 | Gioffre et al. | 426/417 |
| 4,935,580 | 6/1990 | Chao et al. | 585/820 |
| 5,001,098 | 3/1991 | Pacaud et al. | 502/68 |
| 5,013,335 | 5/1991 | Marcus | 55/70 |
| 5,019,667 | 5/1991 | Chao et al. | 585/820 |
| 5,032,152 | 7/1991 | Vansant et al. | 55/66 |
| 5,045,515 | 9/1991 | Chao et al. | 502/67 |
| 5,174,800 | 12/1992 | Schwilling et al. | 96/154 |
| 5,198,001 | 3/1993 | Knebel et al. | 95/141 |
| 5,304,419 | 4/1994 | Shores | 96/154 X |

FOREIGN PATENT DOCUMENTS

| | | | |
|---|---|---|---|
| 255233 | 5/1963 | Australia | 95/141 |
| 54-027838 | 9/1979 | Japan | 95/141 |
| 54-138882 | 10/1979 | Japan | 95/141 |
| 55-104627 | 8/1980 | Japan | 95/117 |

*Primary Examiner*—Robert Spitzer
*Attorney, Agent, or Firm*—Watson, Cole, Grindle & Watson

[57] ABSTRACT

A passive filter for taking up gaseous substances, preferably gaseous smelling substances, from a space, including a porous sorbating, self regenerating material composition, including two material components (A, B), of which a first material component (A) consists of one or more porous materials such as perlite, zeolite, bentonite, silicon dioxide ground to powder or christobalite, and a second material component (B) consists of one or more materials with the capability to take up water molecules directly from the surrounding air, such as silicon dioxide gel, starch or derivatives of cellulose, gypsom, silicates of alkali, aluminum silicate, or fuller's earth. The material components (A, B) are kept joined into a lattice by means of a binder, at which the first material component (A) join with 50–95%, preferably 80–90% (percentage of weight), and the second material component (B) with 5–50%, preferably 10–20% (percentage of weight), in the material composition.

9 Claims, No Drawings

PASSIVE FILTER INCLUDING A SELF-REGENERATING COMPOSITION OF MATERIALS FOR SORBATION OF GASEOUS SUBSTANCES

TECHNICAL FIELD

The present invention concerns a passive filter including a self-regenerating composition of materials which has a capability to take up and keep gaseous, particularly smelling substances from the surrounding air and after that slowly emit these substances and/or their rest products destructed by oxidation or reduction. The invention is described based on gaseous, smelling substances, but does not exclude its application on gaseous substances generally whether these substances emit odour or not.

THE PRIOR ART

According to Swedish patent publication SE-C-387 681 it is known to prevent or reduce the appearance of condensate on a surface by coating the surface with a layer of a composition of materials including granules with heat-insulating and sorbating properties. By chance it was observed that the known coating also has a certain capability to remove odour from the air to which it is in contact by acting as a passive filter. However continued experiments showed a weakness in the smell removing properties of the known coating, namely that it was quickly saturated, at which its capability to take up odour ceased and the coating itself started smelling.

It has long been known that porous materials have a capability to take up odour. Porous materials are used as filters in ventilation equipment by which the smelling substances are sorbated when air, polluted by smelling substances, is forced through the filters by means of a mechanical ventilation. This use is known from a great number of patent publications, as e.g. SE-C-218 164, DE-A-2 129 795, DE-A-1 619 586 and U.S. Pat. No. 4,604,110.

A special case is described in patent publications DE-A-3 735 222 and DE-A-3 801 652. The purpose of the device described is to put a chemical sorbating layer combined with a diffusion-tight layer as a shielding between the contaminated building structure and habitable rooms.

Porous materials also are used to suck smelling substances in a liquid phase or dissolved in a liquid, e.g., to serve as a so-called cat litter or a sorbating material for sanitation works. The patent publications WO 82/04408 and GB-A-1 593 058 describe such materials.

Porous materials also are used in combination with hygroscopic additives for taking up moisture in packings and spaces for apparatuses. Such a material is known from the patent publication DE-B-1 260 441.

The above-described observation of the, in the patent publication SE-C-387 681 described materials capability to take up odour, opened the way to an up to now disregarded technic concerning removing of smelling substances or chemicals from the air in a room, namely to use the fact that smelling substances are volatile and that they only smell in a gaseous shape and that they follow the gas laws.

Smelling substances are more or less volatile and odour arises in that molecules or micro-particles evaporate from the surface of a smelling substance. The evaporation continues until the surrounding air is saturated. In this condition as many odour molecules will be taken up and evaporate at the surface of the smelling substance.

Smelling substances are characterized in that the perception of the odour arises at very low concentrations (as a rule some milligram per $m^3$ air) and far before the point of saturation is reached. The concentration rate of the smelling substance in the air at which odour can be perceived is called the smell threshold value. In order to eliminate the odour, more odour molecules must be eliminated from the air than are emitted from the surface of the smelling substance. In that way that the rate of smelling substances will be below the smell threshold value.

Smelling substances have a gas pressure and their spreading in the room follow the gas laws. This is the reason why odour very quickly spreads in a closed room. As a result of the partial pressure, the odour molecules penetrate into porous materials where they move slower than in the air space. The porous surface therefore takes up more odour molecules than it emits. However, a state of equilibrium will be reached for most porous materials very quickly where the partial pressure in the porous material is equal to the partial pressure in the surrounding air. At that time the material emits as many odour molecules as it takes up. The porous material is then no longer capable of removing odour. If the concentration of the smelling substance in the air is lowered the higher partial pressure in the porous material causes odour molecules to be emitted. The porous material starts smelling.

Water, preferably as a vapour, has a very good capability to bind smelling substances dipolarly. Smelling substances as a rule also are soluble in water. This circumstance is used at odour sanitation of, e.g., smoke damaged cloth, at which there is a method to alternately expose articles of clothing to over-pressure of vapour, which after that is evacuated, and by that eliminates the odour molecules which have penetrated into pores and capillarities. This sanitation method is described in patent publication EP-A-0 111 466. This circumstance also has been used to intensify the capability of porous materials to bind odour substances. This also is described, e.g., in patent publication SE-A-218 164.

SUMMARY OF THE INVENTION

The purpose of the present invention is to bring about a self-regenerating passive filter for gaseous substances, particularly gaseous smelling substances, which is able to cut the intensity peaks in exposed environments.

Common to the materials described in the patent publications mentioned above is that after some time they will be saturated, and after that not act as deodorants. If the odour intensity in the room is lowered, the saturated materials start to emit odour and have to be exchanged. The material described in patent publications DE-A-3 735 222 and DE-A-3 801 652 is suggested to be combined with a mechanical ventilation to solve the problems when the material is saturated.

The insulating and sorbating material described in Swedish patent SE-C-387 681, here called A, has proved to be able to take up smelling substances. This capability is limited as the material very quickly is saturated. By adding another material, here called B, which has a capability to take up and bind water molecules directly from the surrounding air, a material composition showing an improvement in capability for taking up odour is obtained. The two material components A, B are present preferably in the shape of granules in the material mixture. If the binder, which keeps the granules together to a micro-porous lattice, contains water already from the beginning a maximum moisture percentage is obtained in the material composition.

The combination of the material components A and B implies that odour substances are taken up from the air partly by adsorbtion in the first material component A, partly by absortion in the second material component B, which happens because the water bound in the second material component B by its dissolving capacity (or capability to bind molecules dipolarly) absorbs the odour substance.

Experiments have surprisingly shown that varying mixing proportions between the material components A and B give the material composition different odour-sorbating characteristics. The higher the proportion of the first material component A, the quicker the material mixture reaches the saturation point and the more simple it is to desorbate odour substances from the material mixture.

The higher the proportion of the second material component B, the longer it will take before the material mixture reaches the saturation point and the more difficult it is to desorbate odour substances from the material mixture.

It has surprisingly proved to be that the purpose with the invention is achieved by mixing proportions, wherein the first material component A makes 50–95%, preferably 80–90% (percentage of weight), and the second material component B makes 5–50%, preferably 10–20% (percentage of weight), of the material composition.

By this mixing proportion a smell sorbating capability is obtained which is sufficient quick to remove odour from most of the odour-exposed rooms, and a desorbating capability when the odour exposure in the room has ceased which is sufficiently slow to emit the smelling substances and their eventual oxidized rest products without exceeding the smell threshold value. In special cases of odour exposure, the mixing proportions between the material components A and B need to be changed.

Preferably, the first material component A consists of one or more porous materials as perlite, zeolite, bentonite, silicon dioxide ground to powder or christobalite, and the second material component B of one or more water sorbating material as silicon dioxide gel, derivates of starch or cellulose, gypsum, silicates of alkali, aluminum silicate or fuller's earth, at which the participating materials are kept joined into a lattice by means of a binder. Besides it is also preferred to bring at least one of the granules of the material components A, B to sorbate substances which are oxidizing and/or reducing and/or reacting in another way with the smelling substances which are to be removed from the surrounding air. The granules also can have been brought to sorbate substances which rise or lower the pH of the water, depending on which substances which are utilized to bring about a reaction with the odour substances.

As the material composition according to the invention is brought in a layer on a surface, e.g. a ceiling or a wall, in a space with a certain presence of any smelling substance, the odour molecules penetrate the system of pores present in the granules where they move slower and partly will be captured by the water bound in the system of pores. In this way more odour molecules will be captured per time unit in the system of pores than can be released therefrom. The gas pressure of the evaporated odour substance will be lowered close to the sorbating surface, by which more odour molecules are coming up to equalize the pressure difference in the partial pressure.

There has proved to be a direct proportional relation between the volume of the room and the area of the surface treated with the material composition and the smell-removing capability. The bigger the sorbating area is in relation to the volume of the smell-exposed room, the quicker the material composition according to the invention can sorbate a set of air molecules big enough to keep the concentration in the air space below the smell threshold value. Experiments have shown that for most smell-exposed environments the material composition shall cover a surface, which expressed in $m^2$ is at least $\frac{1}{4}$ of the volume of the room expressed in $m^3$. With a smaller covered surface, the time increases to make the room smell-free at a given concentration of odour substances.

There is also a relation between a thickness of the material composition and its sorbating capability. The thicker the layer is, the longer it will last at a given concentration of odour substances in the air before the layer is saturated. The layer can have a thickness of 0;5–5 mm, but preferably 1,0–2,0 mm. A layer of about 1;5 mm is sufficient for normally smell-exposed environments.

The most odour substances are chemically unstable and thus will oxidize and degrade into other, usually not smelling substances. This degradation process will be accelerated in that the odour substances are spread over a large surface in the micro-pore lattice.

The oxidation of the smelling substances can be accelerated by the help of catalyzers. Surprisingly, it has proved that certain metal oxides, such as iron oxides, lead oxides, zinc oxides, and titanium oxides have a conspicuous catalyzing influence. This influence shows in the amount of carbon dioxide increases significantly in the surrounding air as the material composition according to the invention sorbates certain organic odour substances. Also the amount of water vapour increases even if insignificantly. As the odour substances are organic substances this indicates that an oxidation has taken place. The little increase of vapour indicates that most of the released water is taken up by the second material component B in the material composition.

The humidity bound in the material composition according to the invention has another function besides the capability to bind odour substances. The humidity varies with the relative hygroscopic moisture in the surrounding air space. When the hygroscopic moisture is lowered, humidity bound in the micro-pore lattice will evaporate, bringing with a part of the odour substances and oxidation products formed by the odour substances. The humidity formed in connection with the oxidation of the odour substances thus improves the direct capability of taking up smells as the capability to emit the odour substances later. The amount of water which is bound in the second material component B does not correspond to an increased relative hygroscopic moisture and therefore starts evaporating immediately.

The taking up of the smelling substances also can be intensified by spraying a liquid with the capability to absorb gas over the surface covered with the smell-removing material composition. This liquid preferably is constituted by water, but can also be constituted by, e.g., a solution of water and alcohol or hydrogen peroxide. This method can be resorted at smell-sanitation, e.g. after a fire, when an accelerated process is preferred. An accelerated cleaning of the micro-pore surface as well can be achieved by spraying an atomized mist of such a liquid over the surface covered by a smell-removing material composition. Then the material composition very quickly takes up this liquid, which is spread into the whole pore lattice by the capillary forces. If at the same time the relative hygroscopic moisture of the surrounding air is low, a very quick evaporation will take place from the surface. By that it will be achieved to bring relative great amounts of humidity to evaporate in a short time, by which a great part of the oxidation-products formed will be transported away.

In spaces which are exposed to a constant odour because the odour source never or very seldom is removed, the smell sanitation can be carried out by the help of separate panes which alternatively are put into the smell-exposed space and alternatively are taken out to make it possible for them to emit odour substances and rest products in a ventilated space not exposed to odour.

By the invention it is achieved the possibility to remove odour from air in rooms and other spaces by coating walls, ceilings and other surfaces of the rooms/spaces with a layer of the smell-removing material composition according to the invention. With an occasional increase in the concentration of the smell level, the odour will be taken up on the surfaces where the odour substances are bound for a while in order to be emitted later successively. Eventually a degradation of the odour substances can be made in the layer before the rest products emit from this. Preferably, the smell-removing material can be used in public rooms which are periodically used, such as smokey offices, restaurants, changing-rooms, but also for after-treatment of rooms which are sanitated, e.g., after a fire or from moulds. The material composition according to the invention preferably also can be used in refrigerators, preferably in the shape of separate panes coated with the material, which are put into the actual refrigerator to lower the risk for different foods taking on the taste of each other.

As mentioned, the material composition according to the invention also has the capability to take up not smelling gaseous substances, which result however is not as directly possible to observe as at its taking up of smelling substances. This capability can be used to reduce the percentage of gaseous substances which influence other senses at man but the sense of smell. Some gases which lack smell, e.g., can cause a headache and a sick feeling, but by the invention they can be taken up and destructed in the present material composition.

EXAMPLE

The function of the invention will be clear from experiments with formaldehyde. The experiments have been carried out with an acrylic paint to which was added 20% (percentage of weight) granules consisting of perlite and/or fuller's earth in different proportions. The experiments have been carried out in a test chamber with the inside dimensions 1000×1000×1000 mm. The chamber was provided with a valve provided with a fan which evacuated 250 liter/hour. At the time 0 and the time 4 hours 12,5 mg formaldehyde was added and was brought to evaporate quickly. The concentration of formaldehyde in the test chamber was detected after half an hour and after that each hour. The results can be seen from the table below showing the experiments S1–S4 for which the following is present.

S1=A complete empty test chamber.

S2=In the test chamber a pane with the dimension 1000×1000 mm treated with a micro-porous paint where the granules only consist of perlite is inserted.

S3=In the test chamber a pane with the dimension 1000×500 mm treated with a micro-porous paint where the granules consist of 90% (percentage of weight) perlite and 10% (percentage of weight) fuller's earth is inserted.

S4=In the test chamber a pane with the dimension 1000×500 mm treated with a micro-porous paint where the granules consist of 50% (percentage of weight) perlite and 50% (percentage of weight) fuller's earth is inserted.

TABLE

| Time (hour) | S1 | S2 | S3 | S4 |
| --- | --- | --- | --- | --- |
| 0 (12.5 PPM formaldehyde added) | | | | |
| 0.5 | 11 | 5 | 5 | 5 |
| 1.0 | 9 | 6 | 5 | 4 |
| 2.0 | 7 | 4 | 5 | 3.5 |
| 3.0 | 6 | 6 | 5 | 3.5 |
| 12.5 PPM formaldehyde added) | | | | |
| 4.0 | 17 | 8 | 5 | 12 |
| 5.0 | 13 | 6 | 5 | 10 |
| 6.0 | 10 | 5 | 5 | 8 |
| 7.0 | 8 | 7 | 4 | 6 |
| 8.0 | 6 | 6 | 4 | 5 |

The following comments can be made to the experiments S1–S4 in the table above.

S1. The concentration of formaldehyde disappears gradually in that the air gradually will be diluted by the ventilation.

S2. The concentration of formaldehyde disappears gradually in that the air gradually will be diluted by the ventilation. At the same time the porous material containing only perlite adsorbs a great part of the formaldehyde. The percentage of formaldehyde should be lowered gradually because of the ventilation. Irregularities in the lowering series of figures probably shall be ascribed the circumstance that perlite has a good adsorbation-capability but also a very good desorbation-capability.

S3. As can be seen from the table the composition S3 gives the desired effect to adsorb and desorb VOC (volatile organic compounds) in a controlled manner. The composition seems quickly to reach a state of equilibrium in which the concentration of formaldehyde in the test chamber is controlled by the partial pressures in the test chamber and the porous coating on the surface. The desired desorbation makes that the concentration in the test chamber is constant during a great part of the test period and lowers just as the concentration will be below a certain level in consequence of the ventilation.

S4. The mixture of granules with a high concentration of fuller's earth seems to take up formaldehyde quicker than the other granules. At the same time the high figures show, when the second set of formaldehyde is added, that the micro-pores are saturated and have not the same capability to take up formaldehyde any longer.

I claim:

1. A passive filter for taking up gaseous substances from a space, including a porous, sorbating, self-regenerating material composition, including two material components (A, B) of which a first material component (A) consists of at least one porous material selected from the group consisting of perlite, zeolite, bentonite, silicon dioxide ground to powder and christobalite, and a second material component (B) consists of at least one material with capability or taking up water molecules directly from the surrounding air, wherein the material components (A, B) are kept joined to a lattice by means of a binder, and wherein the material composition is in the form of a layer with a thickness of 0.5–5 mm upon one or more surfaces which completely or partially surround the space in which the odour substances can be present.

2. A passive filter according to claim 1, wherein the material composition is located upon a surface with a size expressed in m² which is at least ¼ of the volume of the space expressed in m³.

3. A passive filter according to claim 1, wherein carriers for the material composition are brought inside the space in which odour substances can be present.

4. A passive filter according to claim 3, wherein said carriers are panes.

5. A passive filter according to claim 1, wherein the first material component (A) constitutes 50–95% by weight, and the second material component (B) constitutes 5–50% by weight of the material composition.

6. A passive filter according to claim 1, wherein the material composition is combined with substances which are oxidizing and/or reducing and/or in another way reacting with the odour substances which shall be removed from the surrounding air.

7. A passive filter according to claim 1 wherein the material composition comprises a catalyzer which is constituted by one or more metal oxides such as iron oxides, lead oxides, zinc oxides or titanium oxides.

8. A passive filter according to claim 1, wherein said second material component (B) is one or more material selected from the group consisting of silicon dioxide gel, starch, cellulose derivatives, gypsum, alkali silicates, aluminum silicate and fuller's earth.

9. A passive filter according to claim 1, wherein the thickness of said material composition layer is 1.0–2.0 mm.

* * * * *